March 25, 1930. H. W. SWEET 1,752,039
FRICTION CLUTCH
Filed July 28, 1924
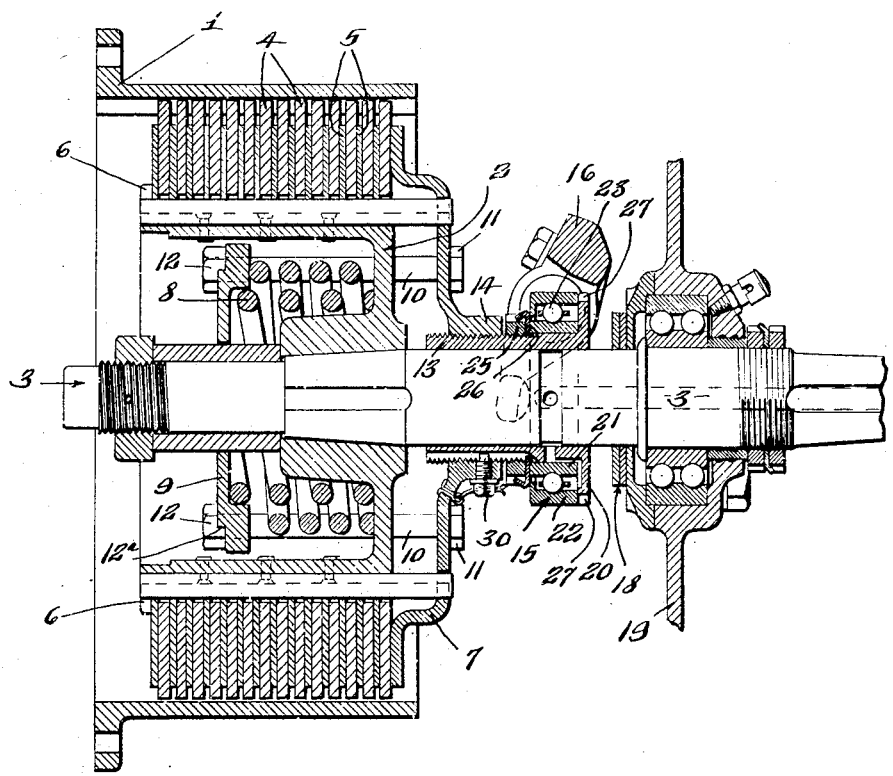
INVENTOR.
Henry W. Sweet
BY Parsons & Bodell
ATTORNEYS.

Patented Mar. 25, 1930

1,752,039

UNITED STATES PATENT OFFICE

HENRY W. SWEET, OF SYRACUSE, NEW YORK, ASSIGNOR TO THE BROWN LIPE GEAR COMPANY, OF SYRACUSE, NEW YORK, A CORPORATION OF NEW YORK

FRICTION CLUTCH

Application filed July 28, 1924. Serial No. 728,524.

This invention relates to friction clutches, such as are used in motor vehicles and has for its object a particularly simple and efficient construction by which the clutch can be initially adjusted and also adjusted to take up for wear.

The invention consists in the novel features and in the combinations and constructions hereinafter set forth and claimed and described.

In describing this invention reference is had to the accompanying drawing which is a vertical sectional view of one form of clutch embodying my invention.

This friction clutch comprises generally driving and driven elements having coacting friction means, one of the elements including a shaft arranged coaxially with the other element, an axially shiftable pressure plate and a main spring coacting with the pressure plate to normally frictionally engage the friction means and means for operating the pressure plate against the action of the spring to release the clutch, said operating or throw out means being connected to the pressure plate by an adjustable connection which when operated changes the relative relation of the pressure plate and the operating means to compensate for wear of the friction means and maintain the normal or starting position of the operating means.

I have here illustrated my invention as embodied in a friction clutch of the multiple disk type.

1 designates the driving element which as will be understood by those skilled in the art, is usually in the form of a drum fixed to the fly wheel of the internal combustion engine of the vehicle.

2 is a driven element which comprises a head or internal drum mounted within the drum 1 on a shaft 3 arranged coaxially with the drum 1.

4 and 5 are sets of interleaved friction disks interlocked respectively with the drum 1 and drum 2 and shiftable axially thereof, the disks thrusting at the inner end of the drum 2 against an abutment 6.

7 is a pressure plate thrusting against the outer end of the series of disks to compress them toward the abutment 6; and 8 is the main spring here shown as located in the drum 2 and thrusting at its inner or rear end against the head of the disk 2 and at its outer end or front against the slidable spring abutment 9 which is connected to the pressure plate by bolts or tie rods 10 extending through holes in the pressure plate, the head of the drum 2 and in the abutment 9, the rods having heads 11 and 12 at their ends thrusting against the abutment 9 and the outer face of the pressure plate 7, one head of each rod or bolt being a nut adjustable to adjust the tension of the spring.

The means for operating the pressure plate against the action of the spring 8 to release the clutch comprises a sleeve 13 movable axially of the shaft 3 in the rear pressure plate and connected to the pressure plate by an adjustable connection, the sleeve being here shown as externally threaded and the pressure plate, as having a hub 14 threading on the sleeve 13. The sleeve 13 has a throw out bearing 15 associated therewith, with which coacts the throw out yoke 16, the latter being operated by the clutch pedal or lever in the usual manner.

18 is the usual brake mounted concentric with the shaft 3 in the rear of the throw out collar, this brake being usually carried by the front wall of the casing 19 of the transmission gearing.

The sleeve 13 is provided with an annular flange 20 at its rear end which is opposed to the brake member 18 and which coacts with the brake member 18 to retard the momentum of the driven element of the clutch when the clutch is released by operating the throw out yoke 16.

The throw out bearing 15 may be of any suitable form, size and construction, it usually including an inner ring 21 mounted on the sleeve 13 adjacent to flange 20, an outer ring 22 and antifriction members as balls 23 between the rings, the throw out yoke pressing against the outer ring 22. The inner ring 21 is shown as held from displacement by a nut 25 threading on the sleeve 13, the nut being locked from unintentional rotation by a lock washer 26 interposed between the nut and the inner ring 21.

The flange 20 is formed with suitable notches 27 by means of which it can be engaged with a tool as a spanner wrench for turning the sleeve 13 to adjust the sleeve to compensate for wear on the friction disks. The sleeve 13 and the pressure plate 7 are held in their adjusted position by a set screw 30 threading into an opening in the hub 14 of the pressure plate and having an end extending into a lengthwise groove in the sleeve 13.

In operation, by withdrawing the set screw 30 and upon turning of the sleeve 13 in the proper direction, the sleeve will be shifted endwise to compensate for wear and the starting position of the sleeve and throw out collar, and the distance between it and the brake maintained. Or the sleeve can be shifted endwise far enough to take up wear in the brake. The main spring automatically takes up the wear of the disks 4, 5 and the spring can be adjusted when desired by turning the bolts 10 relatively to the nuts 12, the latter being interlocked at 12$^a$ with the abutment 9 against turning.

What I claim is:

In a friction clutch, the combination of driving and driven elements having coacting friction means, one of said elements comprising a shaft arranged coaxially of the other element, an axially shiftable pressure plate for engaging said means and having a hub encircling the shaft, a main spring acting on the pressure plate for normally engaging said means, clutch release means for withdrawing the pressure plate against the action of the spring including a sleeve slidable along the shaft and having threaded engagement with said hub, the sleeve having a flange for turning it at its rear end, a throw-out bearing mounted on the sleeve and abutting against said flange and a nut threading on the sleeve against the throw-out bearing for holding it against said flange.

In testimony whereof, I have hereunto signed my name, at Syracuse, in the county of Onondaga, and State of New York, this 11th day of July, 1924.

HENRY W. SWEET.